United States Patent [19]
Kawasaki et al.

[11] 3,860,843
[45] Jan. 14, 1975

[54] ROTATING ELECTRIC MACHINE WITH REDUCED COGGING

[75] Inventors: Itaru Kawasaki; Kazutsugu Kobayashi; Yoshiaki Igarashi, all of Osaka, Japan

[73] Assignee: Matsushita Electric Industrial Co., Ltd., Osaka, Japan

[22] Filed: Mar. 22, 1973

[21] Appl. No.: 343,673

Related U.S. Application Data

[63] Continuation of Ser. No. 154,450, June 18, 1971, abandoned.

[30] Foreign Application Priority Data
June 26, 1970 Japan.............................. 45-56347
June 26, 1970 Japan.............................. 45-56350

[52] U.S. Cl................................. 310/67, 310/156
[51] Int. Cl........................................... H02k 21/22
[58] Field of Search............ 320/67, 156, 254–259, 320/269, 192, 193, 190

[56] References Cited
UNITED STATES PATENTS

| | | | |
|---|---|---|---|
| 3,230,434 | 1/1966 | Bauerlein.......................... | 310/156 X |
| 3,299,335 | 1/1967 | Wessels............................ | 310/156 X |
| 3,586,942 | 6/1971 | McMahan........................ | 310/156 X |

*Primary Examiner*—Donovan F. Duggan
*Attorney, Agent, or Firm*—Wenderoth, Lind & Ponack

[57] ABSTRACT

A rotating electric machine of the multipole type which has a permanent magnet rotor magnetized in such a way that the number of stator salient poles is less than the number of permanent magnet poles. The machine has a smaller cogging force and is easily manufactured. The cogging force is made smaller by shaping both sides of the periphery of each stator salient pole. The ratio of the number of the stator salient poles to the rotor permanent magnet poles is such as to make the rotation of the rotor smooth in spite of variations in the magnetization of the permanent magnet rotor poles.

7 Claims, 3 Drawing Figures

ROTATING ELECTRIC MACHINE WITH REDUCED COGGING

This application is a continuation of U.S. application Ser. No. 154,450, filed June 18, 1971, now abandoned.

This invention relates to a new rotating electric machine, more particularly to a rotating electric machine the rotor of which has a multipole permanent magnet, and the stator of which has a shape suitable for winding the stator coils quickly.

A multipole structure is indispensable for a rotating electric machine which rotates at a low speed, in spite of such a structure being hard to manufacture. Apart from the difficulties in making a rotor permanent magnet having a multipole structure, the stator for such a machine and its winding are complicated. The conventional stator of multipole type consists of a plurality of teeth and slots. These slots become narrower as the number of poles increases. Then it is difficult to wind the stator winding directly and quickly around the teeth. These operations are difficult to mechanize.

In a lap winding the number of stator slots is a multiple of the number of poles in the rotor permanent magnet. As all slots are occupied by stator coils, many stator coils are required. After a plurality of coils are formed beforehand, they are inserted into slots with a few slots between them, and they are connected to each other so as to be able to interact with the rotor permanent magnet. As a results, the stator coils must be loose in lap winding. The portions of the stator coil which occupy the slots contribute to generating a torque or an electromotive force. The other portions of the stator coil which do not occupy the slots, are ineffective for generating torque or electromotive force. Said other portions of the stator coil are called "coil ends." In a lap winding, the length of the coil ends is large, because the coil ends extend across a plurality of slots, each of which is arranged at the same pitch. Because of the aforementioned two reasons, a larger amount of copper wire is necessary, which results in a greater copper loss, which in turn causes a less efficient performance of the rotating electric machine. Further, the iron loss consisting of hysteresis loss and an eddy current loss increases, as there are lots of narrow teeth gathering a high density of magnetic flux from the rotor permanent magnet. Moreover, a harmful vibration remarkably occurs, because of an intense cogging force generated by the interaction between the stator iron core and the rotor permanent magnet. The interaction will be described in detail later on. In order to reduce said cogging force, a skewed stator slot is usually used. But this makes the stator winding more difficult to wind.

On the other hand, in order to make winding the stator easy, there is provided a stator core where stator coils are wound on one stator tooth, that is to say, one stator salient pole. Such a stator core is often used in a machine of the type having only a few poles, for instance in a machine which has a combination of three stator salient poles and two rotor permanent magnet poles, or in a machine having a combination of four stator salient poles and two rotor permanent magnet poles. The same ratio of the number of stator salient poles to the number of rotor permanent magnet poles in the above machines can be used in a rotating electric machine having a multipole structure. However, because the number of stator salient poles is more than the number of rotor permanent magnet poles, many stator coils are still required. In addition, the gaps between the stator salient poles must be large to permit forming the stator winding without difficulty. Furthermore, the greater the number of poles in the rotating electric machine, the narrower the top part of the stator salient pole which faces the rotor permanent magnet. As it is, the stator winding has an excessively short pitch compared with the pitch of the rotor magnet poles. Therefore, the magnetic flux of the rotor permanent magnet is not fully utilized.

The object of the invention is to provide a rotating electric machine having a multipole rotor permanent magnet which has a simple stator structure in order to make winding of the stator easy.

Another object of the invention is to provide a rotating electric machine having a smaller cogging force between the rotor permanent magnet and the stator core made of magnetic material.

Other objects and advantages of the invention will become apparent from the following detailed description of an exemplary structure embodying the invention taken together with the accompanying drawings, in which.

Figure 1:
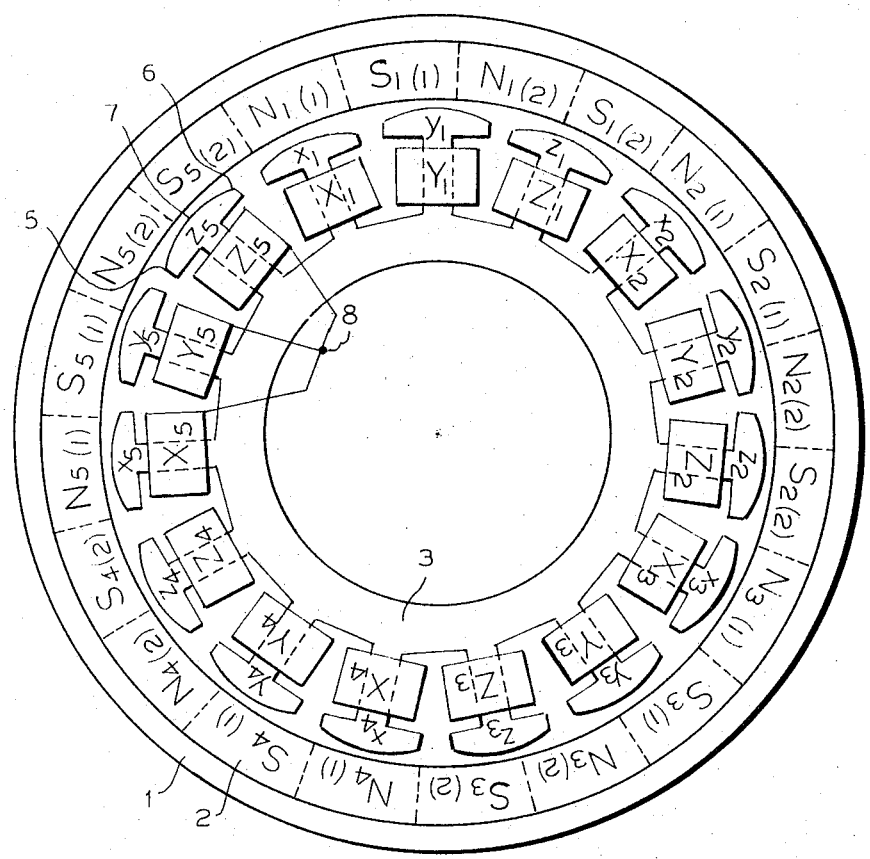
FIG. 1 is a schematic view of a three-phase 20-pole type D.C. motor having an arrangement of stator salient poles and rotor permanent magnet poles in accordance with one preferred embodiment of the present invention.

Referring now to FIG. 1, there is shown a rotor yoke 1 and a stator 3. The rotor yoke 1 has a permanent magnet 2 mounted on the inner periphery facing the stator and magnetized so as to have 10 mangetic pole pairs, that is 20 magnet poles. They are designated hereinafter as $N_{i(j)}$ and $S_{i(j)}$ ($i=1, 2, 3, 4, 5; j=1,2$), wherein N designates the north pole and S designates the south pole. The stator core 3 has 15 salient poles $x_i$, $y_i$, and $z_i$ ($i=1, 2, 3, 4, 5$). The top part of each salient pole facing the rotor permanent magnet is wider than the bottom part thereof on which a stator coil is wound, so that not only can the stator winding be made easily, but the stator core effectively gathers the magnetic flux from the rotor permanent magnet. On said bottom part of the stator salient poles, stator coils $X_i$, $Y_i$ and $Z_i$ ($i=1, 2, 3, 4, 5$) are wound. A stator winding consists of three stator phase windings X, Y, and Z. As shown in FIG. 1, the stator phase windings X, Y and Z each includes five stator coils belonging to the same phase, $X_i$ ($i=1, 2, 3, 4, 5$), $Y_i$ ($i=1, 2, 3, 4, 5$), and $Z_i$ ($i=1, 2, 3, 4, 5$), respectively. The corresponding coils of each of the stator coil groups $X_i$, $Y_i$ and $z_i$ are, of course, suitably connected to form the stator phase winding. And the phase windings are spaced one hundred and twenty electrical degrees from one another.

First, there will be given a description of the cogging force. The cogging force is generated by the interaction between the rotor permanent magnet and the stator core made of magnetic material, such as iron, even if said stator core is not energized by the electric current. The rotor permanent magnet has a plurality of magnetic poles, each of which pulls the stator core. The force between the stator and the rotor is influenced by the shape of the stator core and the distribution of the magnet charge in the rotor permanent magnet. Mathematically the cogging force is determined by the convolution of the stator shape function as defined by the shape of the stator core and the rotor magnetic distribution function related to the magnetic charge of the rotor permanent magnet. For example, in a rotating electric machine which is composed of a stator core having 60 slots and a rotor permanent magnet having 20 poles, the stator shape function is represented by a periodic function with a fundamental period of 60 cycles per revolution, and the rotor magnetic distribution function is represented by a periodic function with a fundamental period of 20 cycles per revolution. Said stator shape function is expanded in a Fourier series having a fundamental component with a period of sixty cycles per revolution and its harmonic components. Said rotor magnetic distribution function is also expanded to a series having a fundamental component with a period of 20 cycles per revolution and its harmonic components. According to the properties of the orthogonal function, the convolution of said two functions is a linear combination of sine wave components whose periods are composed of a common multiple of fundamental periods of said two functions. Therefore, the cogging force is represented by a fundamental component with a period of 60 cycles per revolution and its harmonic components. The fundamental component of the cogging force is a sine wave with a period of 60 cycles. The amplitude of said fundamental component in the cogging force is a product of the amplitudes of the fundamental component of the stator shape function and the third harmonic component of the rotor magnetic distribution function. The number 60 coincides with the fundamental period in the stator shape function, and the third harmonic component of the rotor magnetic distribution function which has a period of 60 cycles is inevitable because the magnetization of a permanent magnet cannot be controlled precisely. Then the amplitude of the fundamental component in the cogging force, which is a sine wave with a period of 60 cycles, becomes large. As a result, a large cogging force is generated 60 times per revolution of the rotor.

In combination having a stator core with 15 salient poles and a rotor permanent magnet of twenty poles, such as shown in FIG. 1, the stator shape function consists of a fundamental component with a period of 15 cycles per revolution and its harmonic components, and the rotor magnetic distribution function consists of a fundamental component with a period of 20 cycles per revolution and its harmonic components. The common multiple of the periods of said two functions is 60 and its multiples. Therefore, the fundamental component of the cogging force has a period with 60 cycles per revolution. But the amplitude of the fundamental component in the cogging force is a multiple of the amplitudes of the fourth harmonic component of the stator shape function and the third harmonic component of the rotor magnetic distribution function. The fundamental component of 60 cycles in the cogging force is not related at all to the fundamental component of the stator shape function which has a period of fifteen cycles. The fundamental cogging force is not due to the fundamental component of the stator shape function, since the number of the stator salient poles is less than that of the rotor permanent magnet poles. Consequently, this rotating electric machine generates less cogging force, and rotates smoothly. Because it is practically free from wow and flutter, it is especially suitable for audio equipment.

Because the stator is composed of a relatively few stator salient poles, the gap between said stator salient poles can be designed to be relatively wide and the number of the stator coils becomes smaller. A stator coil can be wound on each of the stator salient poles easily and directly. If the width of the bottom part of the stator salient pole on which the stator coil is wound is narrower than the top part of the stator salient pole, yet is wide enough so that it is not saturated with magnetic flux, the length of the coil ends, which does not contribute to the rotation of the machine, is reduced. Therefore, the copper losses decrease. Further, the iron loss due to the magnetic flux from the rotor permanent magnet decreases, because the stator has relatively few stator salient poles and each of the stator salient poles need not be given an extremely narrow width. In this case, the top part of the stator salient poles is changeable in width. Then it is possible to design the rotating electric machine either as a short pitch winding type or as a long pitch winding type.

The above explanation of cogging force is applicable when the rotor magnetic distribution function does not include harmonic components which have frequencies lower than 20 cycles per revolution. Where there is a variation in the magnetization of the poles of the rotor permanent magnet, said rotor magnetic distribution function may include a component with a period of one cycle per revolution and its harmonic components. Because the stator shape function consists of a component with a period of 15 cycles per revolution and its harmonic components, the convolution of the stator shape function and said rotor magnetic distribution function includes components with three periods, i.e., 15 cycles, thirty cycles and 45 cycles per revolution. Of said three components of cogging force, the component having a period of 15 cycles per revolution is due to the fundamental components of the stator shape function for a stator core having 15 salient poles. The top part of said stator salient pole which faces the rotor permanent magnet can be wide, so that the stator coil can be wound without difficulty. Because the wide top part of the stator salient pole decreases the amplitude of the fundamental component of the stator shape function, the cogging force having a period of 15 cycles per revolution is reduced. The components with the periods of 30 cycles and 45 cycles per revolution in the cogging force are higher harmonic components than the component with the period of 15 cycles, and are due to the higher harmonic components than fifteen cycles per revolution in the stator shape function. Referring again to FIG. 1, reference numerals 5, 6, and 7 designate the sides and center on the periphery of the stator salient pole $Z_5$ on every stator salient pole. The gap between each of the stator salient poles and the permanent magnet is larger at both sides 5 and 6 of the stator salient pole than at the center 7 of the stator salient pole. In this preferred embodiment of this invention, the amplitudes of the higher harmonic components in the shape function decrease. Thus the cogging force decreases, too.

In FIG. 1, when the current flows in a stator phase winding, the stator coils of said stator phase winding interact with the magnetic flux from the portion of the rotor permanent magnet which faces said stator coils. The magnetic flux interlinking with the stator coils is from the rotor permanent magnet facing said stator coils. If there is a magnetic unbalance in a plurality of the rotor permanent magnet poles, the magnetic flux which is gathered in the stator coils has an unbalance corresponding to said rotor permanent magnet. But the magnetic unbalance of the magnetic flux gathered at the stator phase winding statistically decreases, because each stator phase winding consists of five stator coils. Therefore, the magnetic unbalance of the rotor permanent magnet poles has hardly any influence on the motor revolution. In FIG. 1, the stator coils belonging to one stator phase winding are arranged at the same pitch around the periphery of the stator core. Thus the total magnetic flux which is gathered in one stator phase winding at a given instant is equal to that after the rotor rotates mechanically by 360°/5, i.e., electrically 2+360°, if every stator salient pole is considered magnetically equivalent and the number of turns of each of the stator coils is the same. In other words, the stator phase winding X which has the stator coils $X_i$ interacts with the rotor permanent magnet poles $N_{i(1)}$, and after the rotor rotates 360°/5, said stator phase winding X still interacts with the rotor permanent magnet poles $N_{i(1)}$. The pitch of two magnetic pole pairs $(N_{i(1)}, S_{i(1)})$, $(N_{i(2)}, S_{i(2)})$ in the rotor permanent magnet corresponds to the angular pitch of said stator salient poles belonging to the same stator phase such as the angular pitch between coils $X_i$ and $X_{i+1}$. While the rotor rotates mechanically by 360°/5, the stator phase winding is crossed by the two rotor permanent magnet pole pairs, that is, four magnetic poles. The stator phase winding alternately interacts with only two pole pair groups of the rotor permanent magnet, as the motor rotates. The foregoing description is for rotor permanent magnet pole pairs $(N_{i(j)}, S_{i(j)})$ where $j=1$ and 2 to make for easy understanding, but it should be noted that the whole rotor permanent magnet is divided into two families of pole pairs, i.e., the pairs where $j=1$ and the pairs where $j=2$. Therefore, said stator phase windings alternately interact with only two families of the rotor permanent magnet pole paris. The number of said families of pole pairs of the rotor permanent magnet is defined hereinafter as the number of "states." For example, in the above case the motor has two states. The fluctuation of generated torque decreases according to the decrease of said number of states.

Figure 2:
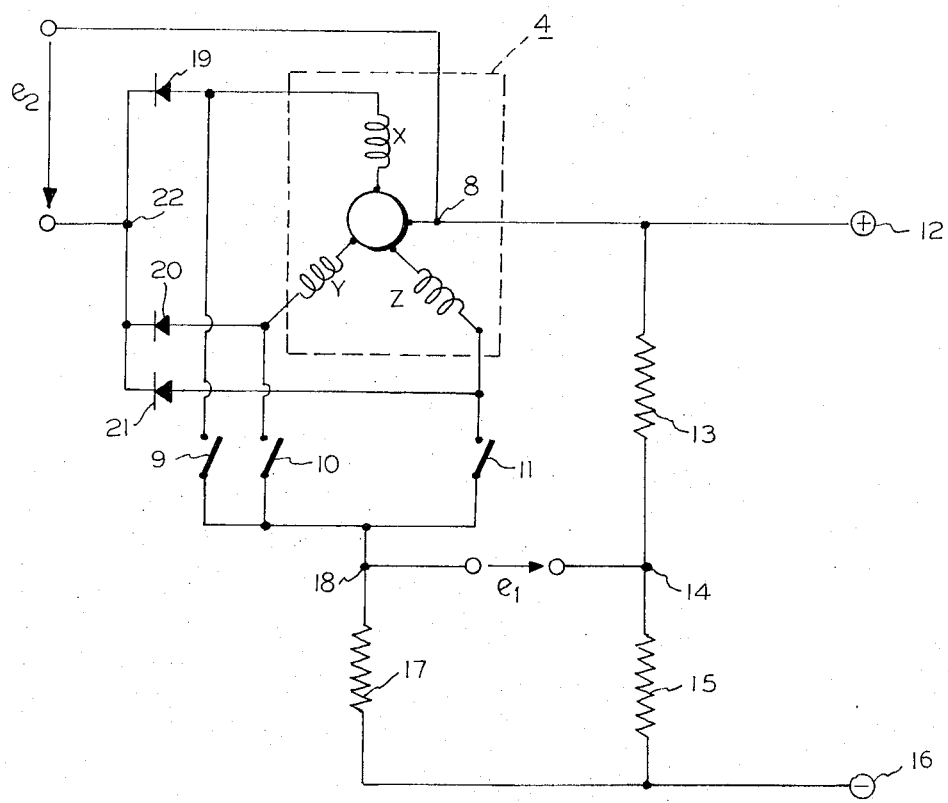
FIG. 2 is a circuit diagram of a device for obtaining a control signal to regulate the speed of a rotating electric machine for explaining the present invention.

Referring to FIG. 2, reference numeral 4 designates the motor shown in FIG. 1. The first terminals of the stator phase windings X, Y and Z are connected together to a power supplying terminal 12. The secondary terminals of said stator phase windings X, Y and Z are connected to a point 18 through switching means 9, 10 and 11, respectively. Said switching means 9, 10 and 11 can operate selectively in such a conventional way of usual commutators' operation as shown and described in e.g., Electrical Engineering, November 1962, pages 879–884 or U.S. Pat. No. 3,274,471. A resistor 13 having a resistance value $r_1$ is connected between a point 14 and said power supplying terminal 12. A resistor 15 having a resistance value $r_2$ is connected between said point 14 and the other power supplying terminal 16. The power supplying terminal 12 is positive and the other terminal 16 is negative. A resistor 17 having a resistance value $r_3$ is connected between the point 18 and said other power supplying terminal 16. The point 8 is connected to the power supplying terminal 12.

The motor 4 revolves, when the stator winding is energized by the power source through the switching means 9, 10 and 11, which operate selectively in relation to the relative position between the pole pairs of the rotor permanent magnet and the stator phase windings X, Y and Z. A counter electromotive force (abbreviated as CEMF) is induced in said stator winding. As is well known, the potential difference $e_1$ between the points 14 and 18 is proportional to said CEMF under the condition of $r_a/r_3=r_1/r_2$, wherein $r_a$ is the internal resistance value of the motor 4. Since the CEMF is proportional to the running speed of the motor, the voltage $e_1$ can be used as a speed controlling signal.

The secondary terminals of the stator phase windings are connected respectively to the anodes of diodes 19, 20 and 21. The cathodes of said diodes 19, 20 and 21 are connected together at a point 22.

A voltage $e_2$ between the points 8 and 22 is the CEMF rectified by the diodes 19, 20 and 21. Said voltage $e_2$ is not mixed with the current flowing in the stator winding, so far as the motor 4 is operated by the half wave current. Therefore, the voltage $e_2$ is proportional to the motor running speed, and it can be also used for control of the motor.

Further, if, in addition to the speed detecting means such as of FIG. 2, there are provided a reference signal means (not shown) generating a reference voltage which is proportional to the predetermined speed of the motor, and a differential means (not shown) coupled to said speed detecting means and said reference signal means for producing a difference voltage and including a D.C. signal amplifying means for amplifying the difference voltage between the output of said speed detecting means and the output of said reference signal means, the motor can be regulated to run at a substantially constant speed by providing the stator winding through the commutators, i.e., switching means with the output voltage from said amplifying means. In short, a negative feedback loop is formed. This technique of regulating a motor at a constant speed is well known in the art such as of U.S. Pat. Nos. 2,814,012 and 3,274,471. If the speed of the rotor increases, the voltage $e_1$ or $e_2$ increases. As the reference voltage is constant, the difference voltage between the voltage $e_1$ or $e_2$ and said reference voltage decreases. Therefore, the output voltage of the amplifying means, which is given to both terminals of the stator winding, also decreases. This causes a decrease in the generating torque and speed of the motor. On the other hand, if the rotor speed falls below the predetermined speed, said torque and speed of the motor also increase. In such a way, the speed of the rotor is controlled desirably. Further details of such motor speed controlling are apparent from e.g., abovementioned U.S. Pat. Nos. 2,814,012 or 3,274,471. The output of said reference signal means is a D.C. signal. Therefore, the result of subtracting said reference signal from the output of said speed detecting means is that the ripple component of said output signal of the speed detecting means becomes dominant. Consequently, the ripple component of said output signal of the speed detecting means should be as small as possible.

Figure 3:
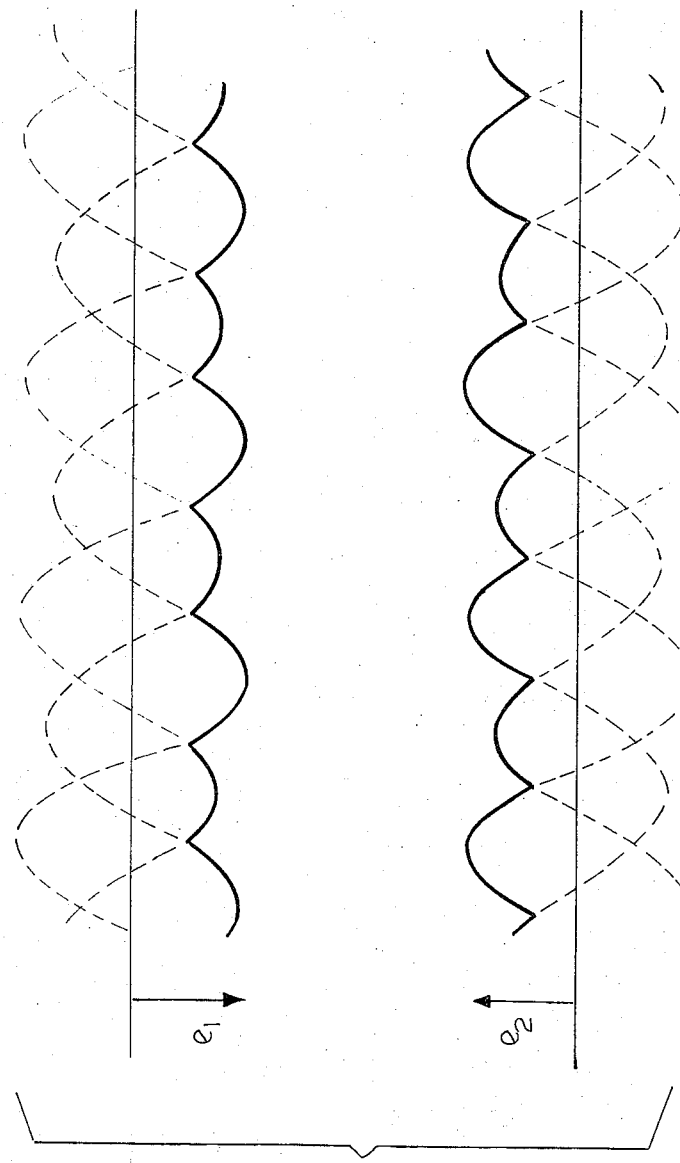
FIG. 3 is a graph indicating the pattern of the control signal obtained by the circuit of FIG. 2 when combined with the motor shown in FIG. 1.

FIG. 3 shows that the voltage $e_1$ or $e_2$ is induced alternately where there are only two states. There this signal is used for controlling the rotor speed, the current supplied to the stator winding depends on the signal $e_1$ or $e_2$. The rotor can rotate most smoothly when the number of the states is a minimum.

The group of the adjacent stator salient poles which includes only one stator coil of the respective stator winding phase is designated as "a stator element" hereinafter. For the motor shown in FIG. 1, a stator element consists of three stator salient poles, and faces two pole pairs of the rotor permanent magnet.

If "a stator element" faces p pole pairs of the rotor permanent magnet, the magnetic flux interacting with each stator winding has $p$ states. As the number of the states relates to the wow-flutter characteristic, it is desirable that the number of said states should be a minimum. In a five phase rotating electric machine, the stator element consists of five stator salient poles. Said stator element must face two pole pairs, i.e., four poles, of the rotor permanent magnet in order to have two states. But this combination is not possible, because the number of stator salient poles would be greater than the number of the rotor permanent poles. Therefore, the stator element would face three pole pairs, i.e., six poles, of the rotor permanent magnet and this motor will have three states. Generally, if the stator winding has $(2n+1)$ phases where n is an integer, it is most adequate where the number of the stator salient poles is less than the number of the rotor permanent poles and the permanent magnet has poles in a ratio of $(2n+2)/(2n+1)$ to the number of said salient poles and the number of states is $(n+1)$. If the stator winding has $(2n)$ phases, it is most adequate that the permanent magnet has a number of poles in a ratio of $(n+1)/n$ to the number of said salient poles and the number of states is $(n+1)$. The rotating electric machine which has only two states must have rotor permanent poles and stator salient poles for a ratio of 4/3 in three phase winding or 4/2 for a two phase winding. But the latter machine cannot start by itself, when it is used as the D.C. motor, because the number of the rotor permanent magnet poles is a multiple of the number of the stator salient poles. Thus the former machine is superior to the others. Expecially when an electronic commutator is used, a machine with fewer phases, such as three phases, is desirable in order to reduce the number of electronic parts of the driving circuits.

Various modifications may be made to the examples described. Thus, for instance, if the stator winding is energized by A.C. current instead of D.C. current, said rotating electric machine can be operated as a multipole type synchronous motor which runs at low synchronous speed, and which has many advantages as described hereinbefore.

What we claim is:

1. A rotating electric machine comprising a rotor having a permanent magnet with a plurality of poles therearound, a stator core having a plurality of salient poles therearound, and a plurality of stator coils, each of which is wound on each of said salient poles and connected to each other so as to form a stator winding having a plurality of phases, wherein said stator winding has $(2n+1)$ phases, and said permanent magnet having a number of poles in a ratio of $(2n+2)/(2n+1)$ to the number of said salient poles, and each of said stator salient poles belonging to one phase being magnetically positioned at the same position as that of the corresponding pole of said rotor.

2. A rotating electric machine as defined in claim 1, wherein said stator winding has 3 phases, and said permanent magnet has a number of poles in a ratio of 4/3 to the number of said salient poles.

3. A rotating electric machine as defined in claim 2, wherein each of said salient poles faces said permanent magnet and has the pole face shaped such that the gap between each salient pole and said permanent magnet is larger at the sides of said salient pole than at the center thereof so that the cogging force decreases for harmonic components higher than a number of cycles per revolution of the rotor equal to the number of salient poles.

4. A rotating electric machine as defined in claim 1, wherein each of said salient poles faces said permanent magnet and has the pole face shaped such that the gap between each salient pole and said permanent magnet is larger at the sides of said salient pole than at the center thereof so that the cogging force decreases for harmonic components higher than a number of cycles per revolution of the rotor equal to the number of salient poles.

5. A rotating electric machine comprising a rotor having a permanent magnet with a plurality of poles therearound, a stator core having a plurality of salient poles therearound, and a plurality of stator coils, each of which is wound on each of said salient poles and which are connected to each other so as to form a stator winding having a plurality of phases, wherein said stator winding has $2n$ phases, and said permanent magnet has a number of poles in a ratio of $(n+1)/n$ to the number of said salient poles, and each of said stator salient poles belonging to one phase being magnetically positioned at the same position as that of the corresponding pole of said rotor.

6. A rotating electric machine comprising a rotor having a permanent magnet with a plurality of poles therearound, a stator core having a plurality of salient poles therearound, and a plurality of stator coils, each of which is wound on each of said salient poles and which are connected to each other so as to form a stator winding having a plurality of phases, the number of said salient poles being a multiple of the number of phases and less than the number of said permanent magnet poles, wherein each of said salient poles faces said permanent magnet and has the pole face shaped such that the gap between each salient pole and said permanent magnet is larger at the sides of said pole than at the center thereof, so that the cogging force decreases for harmonic components higher than a number of cycles per revolution of the rotor equal to the number of salient poles.

7. A rotating electric machine as defined in claim 5, wherein each of said salient poles faces said permanent magnet and has the pole face shaped such that the gap between each salient pole and said permanent magnet is larger at the sides of said salient pole than at the center thereof so that the cogging force decreases for harmonic components higher than a number of cycles per revolution of the rotor equal to the number of salient poles.

* * * * *